(12) United States Patent
Paripovic et al.

(10) Patent No.: US 12,173,132 B2
(45) Date of Patent: Dec. 24, 2024

(54) FOAM WITH IMPROVED EXPANSION BEHAVIOUR WHEN USED IN THIN LAYERS

(71) Applicant: SIKA TECHNOLOGY AG, Baar (CH)

(72) Inventors: Dusko Paripovic, Zürich (CH); Cendrine Ribot, Dietikon (CH)

(73) Assignee: SIKA TECHNOLOGY AG, Baar (CH)

( * ) Notice: Subject to any disclaimer, the term of this patent is extended or adjusted under 35 U.S.C. 154(b) by 535 days.

(21) Appl. No.: 16/633,544

(22) PCT Filed: Aug. 2, 2018

(86) PCT No.: PCT/EP2018/070959
§ 371 (c)(1),
(2) Date: Jan. 23, 2020

(87) PCT Pub. No.: WO2019/030107
PCT Pub. Date: Feb. 14, 2019

(65) Prior Publication Data
US 2020/0207937 A1    Jul. 2, 2020

(30) Foreign Application Priority Data

Aug. 8, 2017  (EP) .................................. 17185371

(51) Int. Cl.
*C08J 9/00*   (2006.01)
*C08J 9/10*   (2006.01)

(52) U.S. Cl.
CPC ............. *C08J 9/0033* (2013.01); *C08J 9/103* (2013.01); *C08J 2203/04* (2013.01); *C08J 2323/08* (2013.01)

(58) Field of Classification Search
CPC ...... C08J 9/0033; C08J 9/103; C08J 2203/04; C08J 2323/08; C08J 9/003; C08J 2203/08
See application file for complete search history.

(56) References Cited

U.S. PATENT DOCUMENTS

2014/0131910 A1 *   5/2014   Kohlstrung ............. C08L 31/04
                                                       521/89
2017/0204238 A1 *   7/2017   Frick ......................... B32B 5/20
(Continued)

FOREIGN PATENT DOCUMENTS

DE   10 2011 080 223 A1   2/2013
WO   WO-2016005536 A1 *  1/2016   ............. B29C 44/18
(Continued)

OTHER PUBLICATIONS

N. Chen; C.B. Park. Strategies for Achieving High Expansion Foams of Crosslinked Ethylene-vinyl Acetate (EVA) Using a Chemical Blowing Agent. Annual Technical Conference of the Society of Plastics Engineers. vol 3. pp. 2491-2497. 2012. (Year: 2012).*
(Continued)

*Primary Examiner* — Christina H. W. Rosebach
(74) *Attorney, Agent, or Firm* — Oliff PLC

(57) ABSTRACT

A thermally expandable composition, including: (a) at least one polymer P, cross-linkable by a free-radical initiator; (b) at least one acrylate A; (c) at least one free-radical initiator; (d) at least one blowing agent; and (e) at least one surfactant, whereby the surfactant is a sulfonate salt. The thermally expandable composition is able to provide sufficient expansion behaviour when used in the form of a thin layer and is especially suitable for baffle and/or reinforcement elements.

11 Claims, 6 Drawing Sheets

(56) References Cited

U.S. PATENT DOCUMENTS

2017/0218155 A1    8/2017  Kohlstrung et al.
2017/0342230 A1*  11/2017  Bordeanu ............. C07C 271/12

FOREIGN PATENT DOCUMENTS

WO    WO-2016097365 A1 *  6/2016  ............. B60R 13/08
WO       2017/137454 A1    8/2017

OTHER PUBLICATIONS

KK, S. et al. Ethylene-Vinyl Acetate Foam. in Polymeric Foams: Fundamentals and Types of Foams (vol. 1). ACS Symposium Series; American Chemical Society. 2023. (Year: 2023).*
Henderson, A.M. Ethylene-Vinyl Acetate (EVA) Copolymers: A General Review. IEEE Electrical Insulation Magazine. Jan./Feb. 1993-vol. 9, No. 1. pp. 30-38. (Year: 1993).*
Sep. 3, 2018 International Search Report issued in International Patent Application No. PCT/EP2018/070959.
Sep. 3, 2018 Written Opinion of the International Searching Authority issued in International Patent Application No. PCT/EP2018/070959.
Xu et al., "Physical Chemistry," Beijing: China Agricultural University Press, Jan. 31, 2017, p. 268.
Lin et al., "Chemical Fundamentals and Analytical Techniques," Beijing: China Medical Science Press, Jan. 31, 2017, p. 18.

* cited by examiner

FOAM WITH IMPROVED EXPANSION BEHAVIOUR WHEN USED IN THIN LAYERS

TECHNICAL FIELD

The present invention relates to a thermally expandable composition, comprising at least one acrylate, at least one free-radical initiator and at least one surfactant, whereby the surfactant is a sulfonate salt, as well as a baffle and/or reinforcement element for hollow structures comprising such a thermally expandable composition, a process for manufacturing such a baffle and/or reinforcement element, its use to seal, baffle, or reinforce a hollow structure, and a method for sealing, baffling, or reinforcing a hollow structure.

BACKGROUND OF THE INVENTION

Manufactured products often contain orifices and cavities or other hollow parts that result from the manufacturing process and/or that are designed into the product for various purposes, such as weight reduction. Automotive vehicles, for example, include several such orifices and cavities throughout the vehicle, including in the vehicle's structural pillars and in the sheet metal of the vehicle doors. It is often desirable to seal such orifices and cavities so as to minimise noise, vibrations, fumes, dirt, water, humidity, and the like from passing from one area to another within the vehicle by means of sealing members or baffle elements built into the orifice or cavity. Likewise, such members or elements often fulfil an additional task of reinforcing the hollow structure of the manufactured product, e.g. automotive part, so much that it becomes more resistant to mechanical stress but still maintains the low weight advantage of the hollow structure.

Such elements used for sealing, baffling or reinforcing often consist of a carrier, made of plastic, metal, or another rigid material, and one or more layers of a thermoplastic material attached to it which is able to expand its volume when heat or another physical or chemical form of energy is applied, but they can also be entirely made of expandable material. Using an adequate design, it is possible to insert the baffle or reinforcement element into the hollow part of the structure during the manufacturing process but also to leave the inner walls of the structure still accessible (or the cavities passable) by e.g. a liquid. For example, during the manufacture process of a vehicle, the hollow parts of a metal frame can still be largely covered by an electro-coating liquid while the baffle or reinforcement elements are already inserted, and afterwards during a heat treatment step, the expandable thermoplastic material of the baffle or reinforcement element expands to fill the cavities as intended.

The development of such baffles or reinforcement elements has led to highly advanced systems, where the expandable material is able to increase its volume by up to 1500% or more, forming a foam-like structure that fills the cavities and adhering to the walls of the structure intended to be sealed, baffled, or reinforced. Especially in automotive manufacturing, this has led to considerable weight reduction and excellent dampening of noise or vibrations in the car body.

Currently employed thermally expandable compositions often consist of polymers that can be cross-linked by peroxides, such as ethylene-vinyl acetate polymers, in combination with comparably small, highly functional acrylates which are incorporated into the cross-linked network upon curing. These compositions furthermore contain blowing agents. Under activation conditions, such as elevated temperature, curing of the cross-linkable network takes place, while simultaneously the blowing agent decomposes and releases gases. This leads to the above mentioned volume expansion and the formation of a stable foam which in ideal cases fills the cavity as intended and adheres to its walls. Such a system is for example disclosed in DE 10 2011 080 223 A1.

The thermally expandable compositions on such baffles or reinforcement elements usually have a thickness of 4-10 mm or more. However, if a thickness of 1 mm or less is chosen, the thermally expandable compositions of the state of the art suffer from insufficient expansion rates, leading to poor performance of the sealing, baffle or reinforcement element.

It is thus desirable to obtain a thermally expandable composition that does not suffer from this limitation and exhibits superior expansion behaviour if thermally expandable compositions are used in the form of thin layers.

SUMMARY OF THE INVENTION

It is an object of the present invention to provide a thermally expandable composition that is able to provide sufficient expansion behaviour and that creates stable foam when thermally expandable compositions in the form of thin layers are used.

Surprisingly, the present invention provides a solution to that problem by providing a thermally expandable composition, comprising
 (a) at least one polymer P, cross-linkable by a free-radical initiator, and
 (b) at least one acrylate A, and
 (c) at least one free-radical initiator, and
 (d) at least one blowing agent,
 (e) at least one surfactant, whereby the surfactant is a sulfonate salt.

The composition according to the present invention is particularly suitable to be used in a sealing, baffle or reinforcement element, for example in automotive applications. Further aspects of the present invention are subject of other independent claims. Preferred embodiments of the invention are subject of dependent claims.

DETAILED DESCRIPTION OF THE INVENTION

Figure 1:
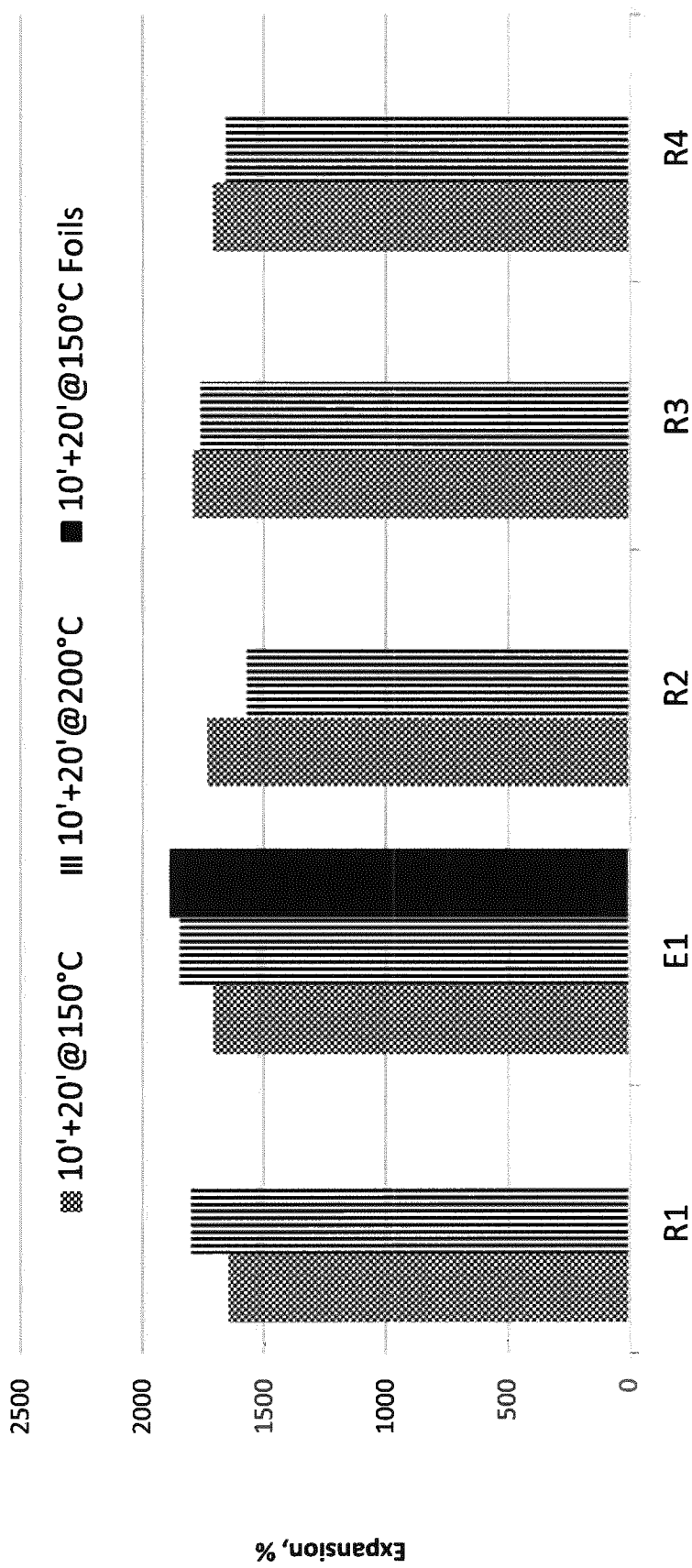
FIG. 1 is a graph depicting expansion percentages of samples tested at various temperatures.

The unit term "wt.-%" means percentage by weight, based on the weight of the respective total composition, if not otherwise specified. The terms "weight" and "mass" are used interchangeably throughout this document.

The term "functionality" in connection with a molecule describes in this document the number of chemical functional groups per molecule. The term "polyfunctional"

describes a molecule with more than 1 functional groups of a given type. For example, a polyfunctional acrylate with a functionality of 3 describes a molecule with 3 acrylate groups. The term "average functionality" is used if a mixture of molecules is present that differ slightly in individual functionality, but in average exhibit a given functionality, as it is sometimes the case with technical grade chemicals.

The term "equivalent" in connection with chemical functional groups describes in this document the mass amount of a substance that equals its equivalent weight. Normally, the equivalent weight is defined as the amount of substance that contains 1 mole of a defined functional group, such as an acrylate group or a peroxide function. The ordinarily skilled artisan in the field of polymer composition formulation uses such numbers to calculate appropriate ratios for active components, and such values are commonly provided by producers of functional chemicals, especially polymers. Accordingly, the "equivalent ratio" (EQ) of two substances is understood herein as the ratio of the equivalents of a first substance to the equivalents of the second substance in a given composition.

The term "radical" used in this document describes, as known to a person with ordinary skill in the art of chemistry, a chemical species with an unpaired valence electron. The cross-linking reactions involved in the curing or hardening of the polymer system of the present invention follow a radical mechanism.

Melt flow index (MFI) is determined by the ASTM D1238 standard method, using a capillary rheometer at 190° C. and a weight of 2.16 kg. MFI values describe the amount of polymer coming out of the capillary under pressure of the defined weight and at the defined temperature during a given time.

Volume changes on the thermally expandable material are determined using the DIN EN ISO 1183 method of density measurement (Archimedes principle) in deionised water in combination with sample mass determined by a precision balance.

The present invention comprises as a first necessary component at least one polymer P that is cross-linkable by a free-radical initiator. Principally all thermoplastic polymers or thermoplastic elastomers capable of cross-linking reactions with a free-radical initiator are suitable. The artisan skilled in the field describes polymers as "cross-linkable by a free-radical initiator" if these polymers contain functional groups, e.g. C—C double bonds, which release hydrogen atoms under influence of a radical starter, e.g. a peroxide, from their backbone or side chain, such that a radical remains that is able to radically attack other polymer chains in a subsequent step, leading to a radical chain reaction cross-linking process and ultimately to a polymer network.

Suitable polymers P include, for example, styrene-butadiene copolymers, styrene-isoprene copolymers, ethylene-vinyl acetate copolymers, ethylene-methacrylate copolymers, ethylene-ethyl acrylate copolymers, ethylene butyl acrylate copolymers, ethylene-(meth)acrylic acid copolymers, ethylene-2-ethylhexyl acrylate copolymers, ethylene-acrylic ester copolymers, polyolefinc block copolymers, and polyolefins such as polyethylene or polypropylene.
The copolymers, meaning polymers made from more than one type of monomer, can be block type copolymers or random copolymers. Polymers P can also be further functionalised, meaning they can contain further functional groups such as hydroxyl, carboxy, anhydride, acrylate, and/or glycidylmethacrylate groups.

Preferred for the present invention is one or more polymer P with an average melt flow index (MFI) of between 1 and 200 g/10 min, preferably between 10 and 100 g/10 min, more preferably between 25 and 75 g/10 min, most preferably between 35 and 55 g/10 min.

Polymer P preferably comprises or essentially consists of ethylene-vinyl acetate (EVA). In this case, the content of vinyl acetate monomers in EVA should be between 8 and 45 wt.-%, preferably between 15 and 30 wt.-%, based on the total weight of the EVA polymer.

In cases where more than one type of polymer is used, the individual MFI combine to an average MFI of the used polymer mixture, which has to be determined according to ASTM D1238.

The thermally expandable composition according to the present invention preferably contains said at least one polymer P with an amount of between 50 and 80 wt.-%, preferably between 60 and 75 wt.-%, more preferably between 62 and 70 wt.-%, based on the weight of the total composition.

In a preferred embodiment, more than one type of polymer is used as polymer P. It was found to be beneficial for the properties of the inventive composition to use at least two types of polymer (herein named P1 and P2) with different melt flow index (MFI), one much higher than the other. For example, an especially preferred embodiment uses a first polymer P1 with an MFI of between 100 and 200 g/10 min and a second polymer P2 with an MFI of between 0.1 and 60 g/10 min, preferably between 0.1 and 10 g/10 min, preferably with a weight ratio of the two polymers P1: P2 in the composition of 0.7 to 1.3, preferably 0.8 to 1.2.

Preferred EVA polymers include, e.g., Elvax® 150, Elvax® 240A, Elvax® 260A, Elvax® 420A (all by DuPont), or the corresponding Evatane® copolymers (by Arkema).

A second necessary component of the thermally expandable composition according to the present invention is at least one acrylate A, with an amount of between 0.25 and 3 wt.-%, preferably between 0.5 and 2 wt.-%, more preferably between 0.7 and 1.7 wt.-%, based on the total weight of the composition.

Acrylate A preferably has a molecular weight of less than 2'500 g/mol, more preferably less than 1'000 g/mol, and preferably exhibits an acrylate functionality of at least 2, of at least 3, more preferably between 3 and 5.

Although polymer P (described above) can comprise acrylate functions, it is beneficial for the inventive composition that these two components are not the same chemical compound. In comparison, acrylate A is generally smaller than polymer P in terms of molecular weight and acts as cross-linker for polymer P. Only using one of the two components would either lead to poor mechanical properties in the final product or would inhibit the formation of a stable foam structure during and after expansion.

Preferred acrylates A with a functionality of 2 include ethylene glycol dimethacrylate, diethylene glycol dimethacrylate, triethylene glycol dimethacrylate, triethylene glycol diacrylate, tripropylene glycol dimethacrylate, 1,3-butanediol dimethacrylate, 1,4-butanediol dimethacrylate, 1,10-dodecanediol dimethacrylate, 1,6-hexandieol dimethacrylate, neopentylglycol dimethacrylate, and polybutylene glycol dimethacrylate.

Preferred acrylates A with a functionality of 3 or higher include glycerol triacrylate, pentaerythritol triacrylate, pentaerythritol trimethacrylate, trimethylolpropane triacrylate, trimethylolpropane trimethacrylate, tetramethylolmethane tetraacrylate, Di-(trimethylolpropane) tetraacrylate, pentaerythritol tetraacrylate, dipentaerythritol pentaacrylate, dipentaerythritol hexaacrylate, tri(2-methacryloxyethyl)

trimellitate, tri(2-acryloxyethyl) isocyanurate, as well as their ethoxylated or propoxylated derivatives.

Further preferred acrylates include highly functional, hyperbranched acrylates with functionalities of between 6 and 16, or higher. Examples of such preferred acrylates include hyperbranched polyester-polyacrylates, for example Sartomer® CN2303 and Sartomer® CN2305, both by Arkema.

A third necessary component of the thermally expandable composition according to the present invention is at least one free-radical initiator, preferably with an amount of between 0.5 and 8 wt.-%, preferably between 1 and 8 wt.-%, more preferably between 2 and 8 wt.-%, even more preferably between 2 and 6 wt.-%, based on the total weight of the composition.

Preferably, the free-radical initiator is a peroxide or a perester, more preferably a peroxide. It is advantageous for the inventive composition to use a peroxide that is inert at room temperature (23° C.) and exhibits an activation temperature suitable for the intended purpose. For example, if the composition is used for a baffle and/or reinforcement element in automotive manufacturing, an activation temperature of between 130 and 250° C. is preferred. Furthermore, it is advisable to select a peroxide with an activation temperature compatible with the decomposition temperature of the blowing agent. If those two temperatures differ too much, it may be more difficult to obtain a thermally expandable composition with optimal performance and stability. Apart from that, other, at room temperature solid components (such as in some cases polymer P) have to be compatible with these components as well, for example in terms of softening or melting point.

Preferred peroxides for the inventive composition are organic peroxides, such as keton peroxides, diacyl peroxides, peresters, perketals, and hydroperoxides. Examples of such preferred peroxides include cumene hydroperoxide, t-butyl peroxide, bis(t-butylperoxy)-diisopropyl benzene, di(t-butylperoxy isopropyl) benzene, dicumyl peroxide, t-butylperoxy benzoate, di-alkylperoxy dicarbonate, diperoxyketals (such as 1,1-di-t-butylperoxy-3, 3,5-trimethyl cyclohexane), keton peroxides (such as methyl ethyl keton peroxide), and 4,4-di-t-butylperoxy-n-butyl valerate.

Especially preferred are 3,3,5,7,7-pentamethyl-1,2,4-trioxepane, 2,5-dimethyl-2,5-di(t-butylperoxy)-3-hexyne, di-t-butyl peroxide, 2,5-dimethyl-2,5-di(t-butylperoxy) hexane, t-butyl cumyl peroxide, di(t-butylperoxy isopropyl) benzene, dicumyl peroxide, butyl-4,4-di(t-butylperoxy) valerate, t-butylperoxy-2-ethylhexyl carbonate, 1,1-di(t-butylperoxy)-3,3,5-trimethyl cyclohexane, t-butylperoxy benzoate, di(4-methylbenzoyl) peroxide, and dibenzoyl peroxide.

Most preferred peroxides for the present inventive composition include dicumyl peroxide, available for example under the trade names Perkadox® BC-40B-PD by Akzo Nobel or Peroxan® DC-40 PK by Pergan and/or di(t-butylperoxyisopropyl) benzene, available for example under the trade names Perkadox® 14-40B-PD by Akzo Nobel or Peroxan® BIB-40 P by Pergan, wherein di(t-butylperoxyisopropyl) benzene is especially preferred.

It may be advantageous for the present invention to use peroxide that is immobilised on a support material, such as silica, kaolin, and/or calcium carbonate, or other suitable materials. This approach may facilitate handling, dosage, and evenly distribution of the peroxide in the composition. Examples for such immobilised peroxide include Perkadox® BC-40B-PD by Akzo Nobel (40 wt.-% dicumyl peroxide on calcium carbonate) or Perkadox® 14-40K-PD by Akzo Nobel (40 wt.-% di(t-butylperoxyisopropyl) benzene on clay and silica). However, care has to be taken in such cases to correctly calculate the wt.-% and especially the equivalents of active substance in the composition, as in this document these values always refer to active compound, and do not include possibly present support material.

It may be advantages for the present inventive composition that the equivalent ratio (EQ) of free-radical initiator, preferably peroxide, to acrylate A, i.e. the ratio of free-radical initiator, preferably peroxide, equivalents to acrylate equivalents, is within a range of between 0.1 and 10, preferably between 0.2 and 6, 0.5 and 3, most preferably between 0.5 and 2.

Within this range the composition exhibits its superior performance in terms of the rate of thermal expansion.

The fourth essential component of the present inventive composition is at least one blowing agent.

A suitable blowing agent may be a chemical or physical blowing agent.

Chemical blowing agents are organic or inorganic compounds that decompose under influence of, e.g., temperature or humidity, while at least one of the formed decomposition products is a gas. Physical blowing agents include, but are not limited to, compounds that become gaseous at a certain temperature. Thus, both chemical and physical blowing agents are suitable to cause an expansion in the thermally expandable composition.

Preferred chemical blowing agents include but are not limited to azo compounds, hydrazides, nitroso compounds, carbamates, and carbazides.

Chemical blowing agents are preferred for the present inventive composition.

Suitable chemical blowing agents are, e.g., azodicarbonamide, azoisobutytronitrile, azocyclohexyl nitrile, dinitrosopentamethylene tetramine, azodiamino benzene, benzene-1,3-sulfonyl hydrazide, calcium azide, 4,4'-diphenyldisulphonyl azide, p-toluenesulphonyl hydrazide, p-toluenesulphonyl semicarbazide, 4,4'-oxybis(benzenesulphonylhydrazide), trihydrazino triazine, and N,N'-dimethyl-N,N'-dinitrosoterephthalamide, and combinations thereof and the like.

Also suitable are dual chemical systems, such as acid/base systems that generate gases upon reaction. One preferred example is sodium hydrogen carbonate and citric acid, a system that generates carbon dioxide when combined in a suitable medium.

Suitable physical blowing agents include expandable microspheres, consisting of a thermoplastic shell filled with thermally expandable fluids or gases. An example for such suitable microspheres are Expancel® microspheres (by AkzoNobel).

In a preferred embodiment, the blowing agent comprises or essentially consists of one or several selected from the list of azodicarbonamide, Expancel® microspheres, and 4,4'-oxybis(benzenesulphonylhydrazide), most preferably azodicarbonamide.

Preferably, the blowing agent is included in the present inventive composition with an amount of between 2 and 15 wt.-%, preferably between 4 and 12 wt.-%, more preferably between 5 and 10 wt.-%, based on the total weight of the composition.

The heat required for the decomposition reaction that causes the foaming (expansion) can be applied externally or internally, the latter e.g. from an exothermic reaction. Preferably, the blowing agent is activated (i.e. decomposes under gas release) at a temperature of less than 160° C., especially between 80° C. to 150° C., more preferably between 90° C. and 140° C.

If the present inventive thermally expandable composition finds a use in a baffle and/or reinforcement element, e.g. in automotive manufacturing, it is preferable that the activation temperature of the blowing agent is adjusted to the manufacturing conditions of the automotive part to be baffled or reinforced. As an example, the baffle and/or reinforcement element can be inserted into a cavity of a structure that needs to be treated by an electrocoating liquid, in its unexpanded state still leaving the surface of the structure accessible, and subsequently, during the heat treatment of the automotive part (i.e. the curing procedure for the electrocoating liquid), the baffle and/or reinforcement element simultaneously (or shortly thereafter) expands to its intended final shape and at least partially closes or fills the cavity. In such a case, the expansion temperature should correspond to the temperature conditions of said heat treatment, i.e. to between 90° C. and 200° C.

Accordingly, it is advisable to select the free-radical initiator, preferably the peroxide, used in the inventive composition in such a way that its activation temperature is in the same range, or slightly below the decomposition temperature of the blowing agent. This ensures that the radical mechanisms leading to polymer cross-linking take place at a point which enables the formation of a stable, foam-like structure.

The fifth essential component of the present inventive composition is at least one surfactant, whereby the surfactant is a sulfonate salt.

The sulfonate salt comprises any cation or a cationic group capable of forming a salt with the sulfonate. Preferably, the sulfonate salt is a sulfonate alkali metal salt, most preferably a sulfonate sodium salt.

Preferably, the sulfonate salt is selected from sulfonates from the group consisting of:

sulfosuccinates, preferably sulfosuccinates of the formula (I)

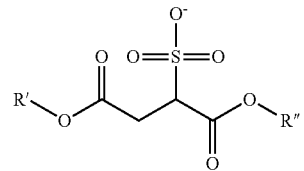

whereby R'=C8-C18, R"=H or C8-C18, preferably R' and R"=C8-C18, most preferably the sulfonate is Di-2-ethylhexyl sulphosuccinate. Di-2-ethylhexyl sulphosuccinate sodium salt is for example commercially available as Disponil SUS IC 875 from BASF, alkyl benzene sulfonates, alkanesulfonates, preferably primary and secondary alkanesulfonates, more preferably secondary C13-C18-alkanesulfonates, most preferably secondary C13-C17-alkanesulfonates, ether sulfonates, methyl ester sulfonates, and alpha-olefin sulfonates, preferably C14-C16-olefin sulfonates.

Most preferably, the sulfonate salt is selected from sulfonates from the group consisting of sulfosuccinates, preferably sulfosuccinates of the formula (I)

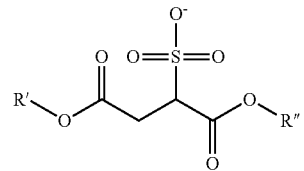

whereby R'=C8-C18, R"=H or C8-C18, preferably R' and R"=C8-C18, most preferably the sulfonate is Di-2-ethylhexyl sulphosuccinate, alkanesulfonates, preferably primary and secondary alkanesulfonates, more preferably secondary C13-C18-alkanesulfonates, most preferably secondary C13-C17-alkanesulfonates.

It is preferred if the present inventive composition comprises said sulfonate salt with an amount of between 0.1 wt.-% and 5 wt.-%, 0.2 wt.-% and 4 wt.-%, 0.2 wt.-% and 3.5 wt.-%, preferably 0.25 wt.-% and 2 wt.-%, based on the total weight of the composition.

It may be further preferred if the present inventive composition comprises said sulfonate salt with an amount of between 1 wt.-% and 2 wt.-%, if the composition comprises the free-radical initiator with an amount of between 3 and 6 wt.-% and if the composition comprises the acrylate A with an amount of between 1 and 2 wt.-%, based on the total weight of the composition. This is advantageous for high expansion rates.

It may be further preferred if the present inventive composition comprises said sulfonate salt with an amount of between 0.2 wt.-% and 1.2 wt.-%, if the composition comprises the free-radical initiator with an amount of between 1.5 and 3 wt.-% and if the composition comprises the acrylate A with an amount of between 0.5 and 1 wt.-%, based on the total weight of the composition. This is advantageous for high expansion rates.

It is further preferred that the inventive composition contains less than 2 wt.-%, less than 1 wt.-%, preferably less than 0.5 wt.-%, more preferably less than 0.2 wt.-%, based on the total weight of the composition, of:

sulfate salts, preferably of alkyl sulfates, and fatty alcohol polyglycol ether sulfates.

It is advantageous for the present invention to use an activator, accelerator, or catalyst in combination with the blowing agent. Examples of compounds suitable for this purpose include zinc compounds, such as zinc oxide, zinc stearate, zinc bis(p-toluenesulphinate), or zinc bis(benzenesulphinate), or magnesium oxide, and/or (modified) urea compounds. Most preferred are zinc compounds, especially zinc oxide.

The inventive thermally expandable composition preferably comprises such an activator for said blowing agent with an amount of between 2 and 10 wt.-%, preferably between 4 and 8 wt.-%, more preferably between 5 and 7 wt.-%, based on the total weight of the composition.

Apart from the essential ingredients, the present inventive thermally expandable composition may contain other components commonly used in such compositions and known to the ordinarily skilled artisan in the field.

These include, for example, fillers, colorants, dispersion aids or homogenizers, adhesion promoters, antioxidants, stabilizers, and the like.

Suitable as fillers are, e.g., ground or precipitated calcium carbonate, calcium-magnesium carbonate, talcum, gypsum, graphite, barite, silica, silicates, mica, wollastonite, carbon black, or the mixtures thereof, or the like.

Fillers are, if at all, preferably incorporated in the inventive compositions with an amount of between 1 and 15 wt.-%, based on the total weight of the composition.

Colorants or dyes, such as pigments, e.g. on the basis of carbon black, may be included in the present inventive compositions. Their amount is preferably between 0 and 1 wt.-%, based on the total weight of the composition.

Dispersion aids or homogenizers may be beneficial for the present inventive composition in order to facilitate a homogeneously mixed composition. Preferably used such compounds include hydrocarbon resins, for example Novares® TL 90 available from Rutgers, Germany, Wingtack® resins (by Cray Valley), Escorez® tackifying resins (e.g., Escorez® 1304, by ExxonMobil), and Piccotac® hydrocarbon resins (e.g., Piccotac® 1100 or Piccotac® 1100E, by Eastman). Such compounds are preferably included in the inventive compositions with an amount of between 2 and 10 wt.-%, preferably between 4 and 8 wt.-%, more preferably between 5 and 7 wt.-%, based on the total weight of the composition.

In preferred embodiments, the inventive composition also includes adhesion promoters. Preferably these substances are incorporated into the polymer network during the cross-linking reactions via functional groups similar to those present in polymer P. Suitable adhesion promoters include, for example, ethylene-glycidyl methacrylate copolymers, such as Lotader® ADX 1200S, Lotader® AX8840, Lotader® 3210, Lotader® 3410 (by Arkema) or Lotryl® copolymers (by Arkema).

Adhesion promoters are preferably used in compositions according to the present invention with an amount of between 2 and 15 wt.-%, preferably between between 4 and 10 wt.-%, more preferably between 5 and 7 wt.-%, based on the total weight of the composition.

Further potentially useful additives include antioxidants and stabilizers, commonly used in polymer-based compositions and known to the person skilled in the art of polymer-based composition formulation. Examples of suitable antioxidants and stabilizers include sterically hindered thioethers, sterically hindered aromatic amines, and/or sterically hindered phenols, such as bis(3,3-bis(4'-hydroxy-3-t-butylphenyl)butanoic acid) glycol ester. Such substances are preferably included with an amount of between 0 and 0.5 wt.-%, preferably between 0.1 and 0.3 wt.-%, based on the total weight of the composition.

The compositions according to the present inventions can be manufactured by mixing the components in any suitable mixing apparatus, e.g. in a dispersion mixer, planetary mixer, double screw mixer, continuous mixer, extruder, or dual screw extruder.

It may be advantageous to heat the components before or during mixing, either by applying external heat sources or by friction generated by the mixing process itself, in order to facilitate processing of the components into a homogeneous mixture by decreasing viscosities and/or melting of individual components. However, care has to be taken, e.g. by temperature monitoring and use of cooling devices where appropriate, not to exceed the activation temperatures of the blowing agent and/or peroxide. The final composition is preferably essentially solid at room temperature (23° C.), meaning that it does not visibly deform at this temperature just by means of gravity during at least 24 h.

After mixing, the resulting composition may be shaped into its desired form by, e.g., extruding, blow-moulding, pelleting, injection moulding, compression moulding, punching or stamping or any other suitable process.

The thermally expandable compositions may be produced in a substantially one-step process, involving the addition of all components in a series and/or simultaneously. However, it may also be advantageous to formulate the composition as a two-part system, or even multipart system, and mix these parts into the final composition at a later stage. Such an approach may, for example, increase shelf life of the composition in places with demanding conditions (such as extraordinarily high temperatures), optimise storage room demand and transport weight, and allow for tailor-made, modular compositions regarding different applications.

The expansion of the thermally expandable composition according to the present invention is triggered by heat. This means, both the blowing agent and the a free-radical initiator component are activated by a thermal process that exceeds their respective activation temperature and exhibits a duration long enough for both processes (free-radical initiator-initiated radical polymerisation and decomposition of the blowing agent including gas formation) to proceed until the expandable material has expanded and cured into its intended final (sufficiently expanded and stable) state. The optimal temperature and duration (dwell time) depends on the blowing agent and peroxide used in the inventive composition. These values are provided by the manufacturers of such components and/or are known to the ordinarily skilled artisan.

Another aspect of the present invention is the use of such thermally expandable compositions for the manufacturing of baffle and/or reinforcement elements. Such elements are used to seal, baffle, and/or reinforce open or hollow structures, e.g. a cavity in an open or hollow structural part of an automobile. Hollow parts in cars may include body components (e.g., panels), frame components (e.g., hydroformed tubes), pillar structures (e.g., A, B, C, or D-pillars), bumpers or the like. Open parts in cars may include roofs or doors. If such elements are used to seal or baffle then the structures are preferably hollow structures. If such elements are used to reinforce then the structures can be open or hollow, preferably they are open structures, especially when the thermally expandable composition has a sheet-like structure.

Another aspect of the present invention is a baffle and/or reinforcement element for open and hollow structures, wherein said element comprises a thermally expandable composition as described before.

In one preferred embodiment, such a baffle and/or reinforcement element for open and hollow structures consists essentially, preferably exclusively, of a thermally expandable composition. In this case, it is advantageous to design the shape of the element in a way that it can be easily fitted into and attached to the walls of the open or hollow structure to be baffled and/or reinforced.

Preferably, the thermally expandable composition has a sheet-like structure with a thickness of 0.1 to 1 mm, 0.2 to 0.8 mm, preferably 0.3 to 0.7 mm.

It may be further advantageous if the thermally expandable composition has a sheet-like structure with a length of 5 to 300 cm, preferably 100 to 250 cm and a width of 5 to 300 cm, preferably 50 to 150 cm. With such a form the element is especially suited to seal, baffle, or reinforce, preferably reinforce, larger areas, e.g. as patches. In case the element has a width of 1 to 20 cm, preferably 2 to 10 cm, the element is especially suited to be used as stripes to seal, baffle, or reinforce.

Manufacturing is in this case preferably done by injection moulding, punching or stamping, or extrusion through a shape template.

In another preferred embodiment, such a baffle and/or reinforcement element for open or hollow structures comprises, apart from the thermally expandable composition, a carrier element on which the inventive thermally expandable composition is deposited or attached. Such a design may be more cost-efficient and it may facilitate fixation of the baffle and/or reinforcement element on the walls of the structure to be baffled and/or reinforced, e.g. by incorporation of pins, bolts, or hooks on the carrier element. Furthermore, with a suitable design of the carrier element, the mechanical performance and stability of the baffle and/or reinforcement element according to the present invention can be increased.

Preferably, the thermally expandable composition has a sheet-like structure with the preferred thickness, length and/or width as described above.

Said carrier element may consist of any material that can be processed into a shape useable for an embodiment of the present invention.

Preferred materials are polymeric materials, such as a plastic, elastomers, thermoplastics, thermosettable polymers, a blend or other combination thereof, or the like. Preferred thermoplastic materials include, without limitation, polymers such as polyurethanes, polyamides, polyesters, polyolefins, polysulfones, poly(ethylene terephthalates), polyvinylchlorides, chlorinated polyolefins, or the like. Especially preferred are high-temperature stable polymers such as poly(phenyl ethers), polysulfones, polyethersulfones, polyamides, preferably polyamide 6, polyamide 6,6, polyamide 11, polyamide 12, or a mixture thereof. Other suitable materials include metals, especially aluminium or steel, or naturally grown, organic materials, such as wood or other (pressed) fibrous materials. Also glassy or ceramic materials can be used. It is possible to use any combination of such materials. It is also contemplated that such materials can be filled (e.g. with fibres, minerals, clays, silicates, carbonates, combinations thereof or the like) or foamed.

Preferably the carrier is made of polymeric materials and metals, more preferably metals, especially aluminium or steel.

The carrier element can further exhibit any shape or geometry. It can also consist of several, not directly connected parts. For example, it can be massive, hollow, or foamed, or it can exhibit a grid-like structure. The surface of the carrier element can typically be smooth, rough, or structured, according to the intended use of the baffle and/or reinforcement element.

Preferably, the carrier has a sheet-like structure with a thickness of 0.1 to 5 mm, 0.2 to 3 mm, 0.5 to 2 mm, preferably 0.75 to 1.5 mm. It may be further preferred if the carrier has a sheet-like structure with a width and/or length that corresponds to +/− more than 50%, more than 60%, more than 70%, preferably more than 80%, most preferably more than 90%, of the width and/or length of the sheet-like structure of the thermally expandable composition.

Most preferred the carrier and the thermally expandable composition have a sheet-like structure with a thickness that is described above as a preferred thickness for the carrier, respectively the sheet-like structure. Further, it is preferred if the carrier has a width and length that is more than 80%, most preferably more than 90%, of the width and length of the sheet-like structure of the thermally expandable composition. Such an element is especially suited as a reinforcement element for open or hollow structures, preferably open structures.

The manufacturing process of a baffle and/or reinforcement element in accordance with the present invention depends largely on the material of the carrier element. If the material of the carrier element can be (injection-) moulded or extruded, the whole baffle and/or reinforcement element can be produced in a two-step injection-moulding process or a co-extrusion process of the carrier element and the thermally expandable composition. If using a two-step injection moulding process, in a first step, material for the carrier element is injected into the mould. After solidification, the cavity of the injection moulding tool is enlarged or adjusted, or the injection-moulded piece is transferred into another tool and the second component, in this case the material for the thermally expandable composition, is injected.

If the carrier element is not shaped by injection-moulding or extrusion, e.g., because it consist of a metal or alloy, it may be first manufactured by a suitable process and then introduced into the injection-moulding tool, and the thermally expandable composition may be injection-moulded into the tool where the carrier element was placed. Another possibility is to extrude the thermally expandable composition onto the pre-fabricated carrier element. Of course there is also the possibility of manufacturing the carrier element and the expandable composition element individually by a suitable process, and then attaching the expandable composition element to the carrier element by any suitable means, such as chemically or physically, e.g. by gluing or the like, or mechanically, e.g. by bolting, screwing, or the like.

Another aspect of the present invention is the use of the baffle and/or reinforcement element as described above to seal, baffle, or reinforce, especially reinforce, a cavity or hollow or open structure of a land-, water-, or air-vehicle, preferably an automotive vehicle, and/or a cavity of a building such that the transmission of noise, vibrations, humidity, and/or heat is reduced, and/or the object surrounding said cavity is mechanically strengthened.

A further aspect of the present invention is a method for sealing, baffling and/or reinforcing, preferably reinforcing, a cavity or hollow structure, characterised in that an element comprising a thermally expandable composition according as described above is introduced into said cavity or hollow structure and subsequently thermally expanded such that said cavity or hollow structure is at least partially filled by the expanded composition. Preferred temperature for the thermal expansion process is between 110° C. and 220° C., 120 and 210° C., preferably 140 and 200° C. Preferred baking time for the compositions is between 5 min and 90 min, preferably 10 and 60 min, more preferably 15 and 30 min.

A further aspect of the present invention is the use of a surfactant as mentioned before to increase the thermal expansion of a thermally expandable composition, comprising (a) at least one polymer P, cross-linkable by a free-radical initiator, and (b) at least one acrylate A, and (c) at least one free-radical initiator, and (d) at least one blowing agent, compared to such a thermally expandable composition not comprising said surfactant.

Preferably the expandable composition has a sheet-like structure with a thickness of 0.1 to 1 mm, 0.2 to 0.8 mm, preferably 0.3 to 0.7 mm. Further preferred, the expandable composition has a sheet-like structure with the preferred thickness, length and/or width as described above. It may be further advantageous if the expandable composition is attached to a carrier as described above.

Preferably the thermal expansion is performed at a temperature of between 110° C. and 220° C., 120 and 210° C., preferably 140 and 200° C., for between 5 min and 90 min, preferably 10 and 60 min, more preferably 15 and 30 min.

Preferably the thermal expansion is measured in volume changes on the thermally expandable material are determined using the DIN EN ISO 1183 method of density measurement (Archimedes principle) in deionised water in combination with sample mass determined by a precision balance.

The invention is further explained in the following experimental part which, however, shall not be construed as limiting the scope of the invention.

EXAMPLES

1. Formulation of example compositions 1.1 Compositions 19 examples of inventive compositions (E1 to E19) and 7 non-inventive reference compositions (R1 to R7) were prepared according to the procedure shown below. The exact individual compositions in wt.-%, based on the total weight of the individual respective composition, are listed in Table 2-Table 4.

Details on the ingredients used in the inventive example compositions E1 to E19 and non-inventive reference compositions R1 to R7 described herein are listed in Table 1.

TABLE 1

Details on the ingredients and their trade names used in the inventive and non-inventive example compositions in this document.

| Ingredient | Description |
| --- | --- |
| Polymer P1 | Ethylene-vinyl acetate (EVA) with 18 wt.-% vinyl acetate monomer and a melt flow index (MFI) of 150 g/10 min (ATSM D1238) |
| Polymer P2 | EVA with 28 wt.-% vinyl acetate monomer and MFI of 6 g/10 min (ATSM D1238) |
| Peroxide | Di-(2-tert.-butyl-peroxyisopropyl)-benzene (40 wt.-%) on mineral carrier. |
| Blowing agent | Azodicarbonamide |
| Activator | Zinc oxide |
| Processing agent | Polyethylene wax (melting point 118° C. (ASTM D3954)) |
| Adhesion promoter | Ethylene-glycidyl methacrylate copolymer |
| Tackifier | Hydrocarbon resin |
| Acrylate | Trimethylolpropane triacrylate |
| Non-ionic 1 | Glycerinalkoxylate, Degressal SD 23, BASF |
| Non-ionic 2 | Stearyl erucamide, Kemamide E 180, PMC Biogenix |
| Non-ionic 3 | Polyether-modified siloxane, Dynol 960, Evonik |
| Sulfate 1 | C12-14-fatty alcohol sulfate sodium salt, Sulfopon 1214G, BASF |
| Sulfonate salt 1 | Sodium sec-alkanesulfonates, Armostat 3002, AkzoNobel |
| Sulfonate salt 2 | Sodium di-2-ethylhexyl sulphosuccinate, Disponil SUS IC 875, BASF |
| Sulfonate salt 3 | Sodium C13-17 alkyl sec sulfonate, Hostastat HS1, Clariant |
| Sulfonate salt 4 | Sodium C14-17 alkyl sec sulfonate, Hostapur SAS 93, Clariant |

1.2 Mixing and moulding procedure

All inventive and non-inventive example compositions in this document were prepared according to the following procedure:

In a first step, polymer P1 and P2, the adhesion promoter, the tackifier, the processing aid and if applicable a surfactant (non-ionic, sulfate or sulfonate salt) were mixed and melted at 95° C. with a mixing rate of 50 rpm (rounds per minute) during 10 min (minutes). After this, half of the activator amount was added during 1 min and mixing was continued during 4 min at 50 rpm. Mixing was continued at 20 rpm during 5 min until the mixture cooled down to 95° C.

After this, the blowing agent, acrylate A, and the second half of the activator amount were added during 1 min, followed by mixing at 50 rpm for 1 min.

Finally the peroxide was added during 1 min and mixing was continued for 2 min at 50 rpm.

The mixtures were moulded with a temperature of 95° C. and a pressure of 60 bar with the same temperature during 15 s (seconds) into sheets with a thickness of 4 mm (millimetres). These sheets were cooled down to room temperature (23° C.) and used for the subsequently described expansion experiments (sheets).

Some of these sheets were further processed into foils by further applying pressure of 60 bar with a temperature of 95° C. into foils with a thickness of 0.5 mm. These foils were cooled down to room temperature (23° C.) and used for the subsequently described expansion experiments (foils).

Both the sheets as well as the foils were subsequently cut to 25×25 mm coupons (samples) and expanded.

2 Testing of example compositions 2.1 Expansion stability

Expansion and expansion stability was tested in all samples by heat treatment (baking) of the individual samples at various temperatures during 20 min in an oven. The heating ramp from room temperature (23° C.) to the respective baking temperature was always 10 min. The temperatures and magnitude of expansion (in % based on the original volume prior to expansion) at the corresponding baking temperatures are shown in the FIGS. 1 to 6 for the inventive compositions and for the non-inventive reference compositions.

Expansions were quantified for each sample by measuring the density before and after expansion. The densities were determined according to DIN EN ISO 1183 using the water immersion method (Archimedes principle) in deionised water and a precision balance to measure the mass.

Tables 2 to 4 furthermore show the ratio of peroxide equivalents to acrylate equivalents (equivalent ratio, EQ) for each sample composition. Equivalent herein means the number of functional groups (peroxide oxygen or acrylate function) of a given sample mass in mol, or in other words the weight of the used ingredient divided by its equivalent weight. Equivalent and equivalent weight are terms known to the ordinarily skilled artisan in polymer chemistry and formulation.

Figure 2:
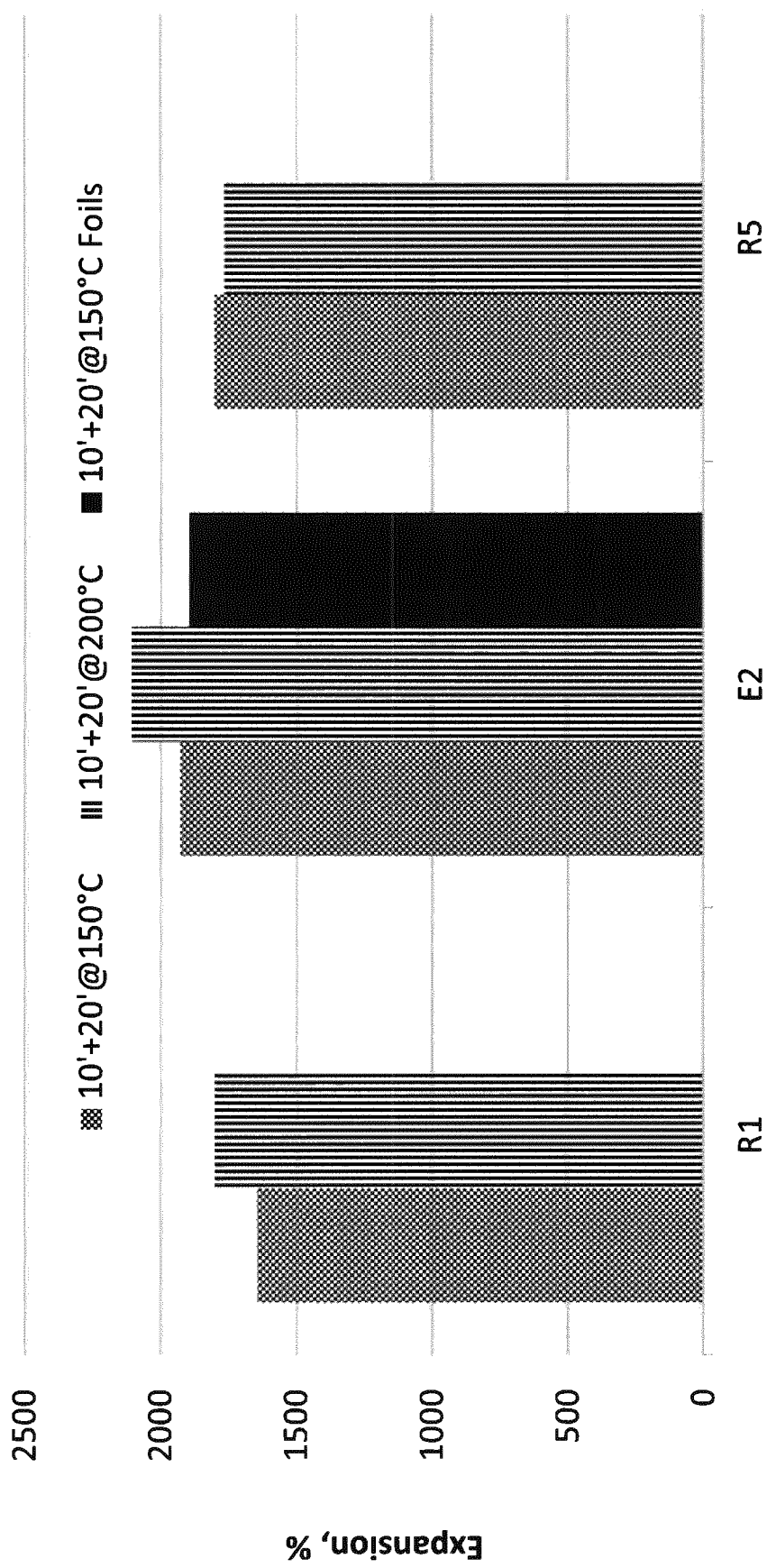
FIG. 2 is a graph depicting expansion percentages of samples tested at various temperatures.
Figure 3:
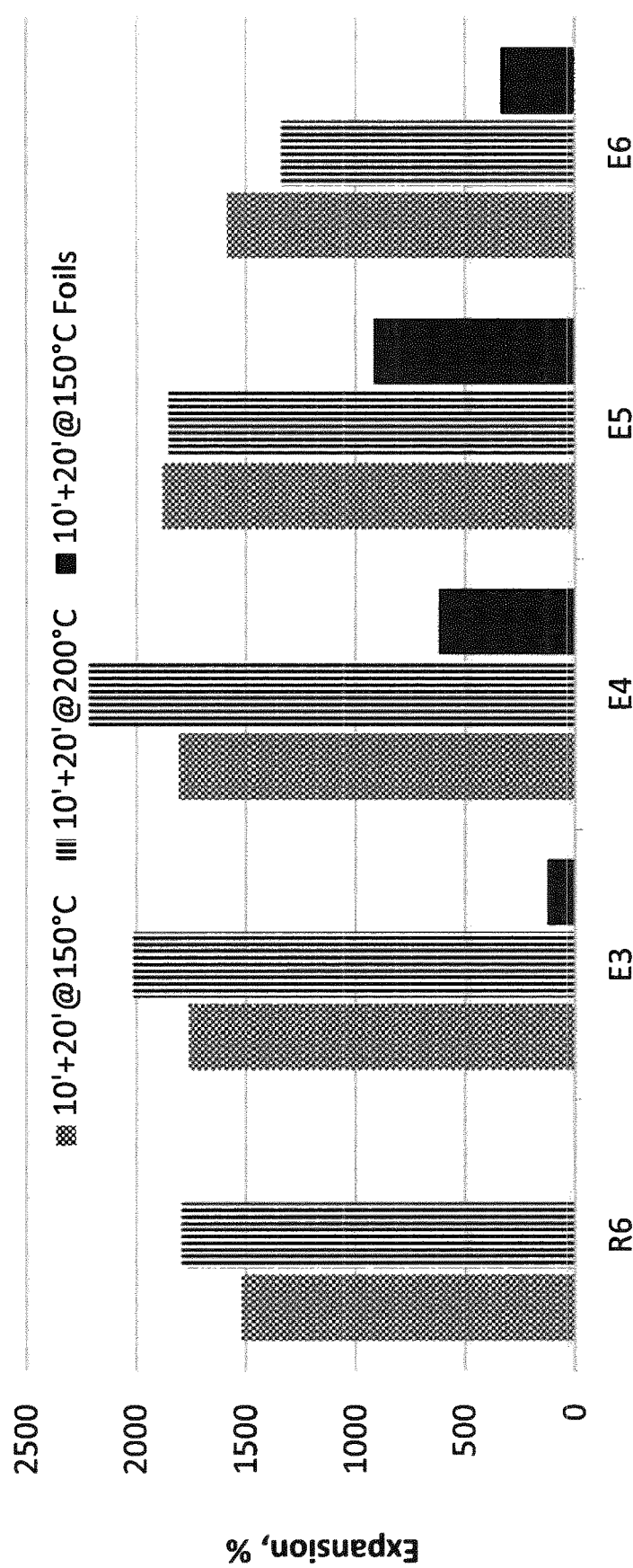
FIG. 3 is a graph depicting expansion percentages of samples tested at various temperatures.
Figure 4:
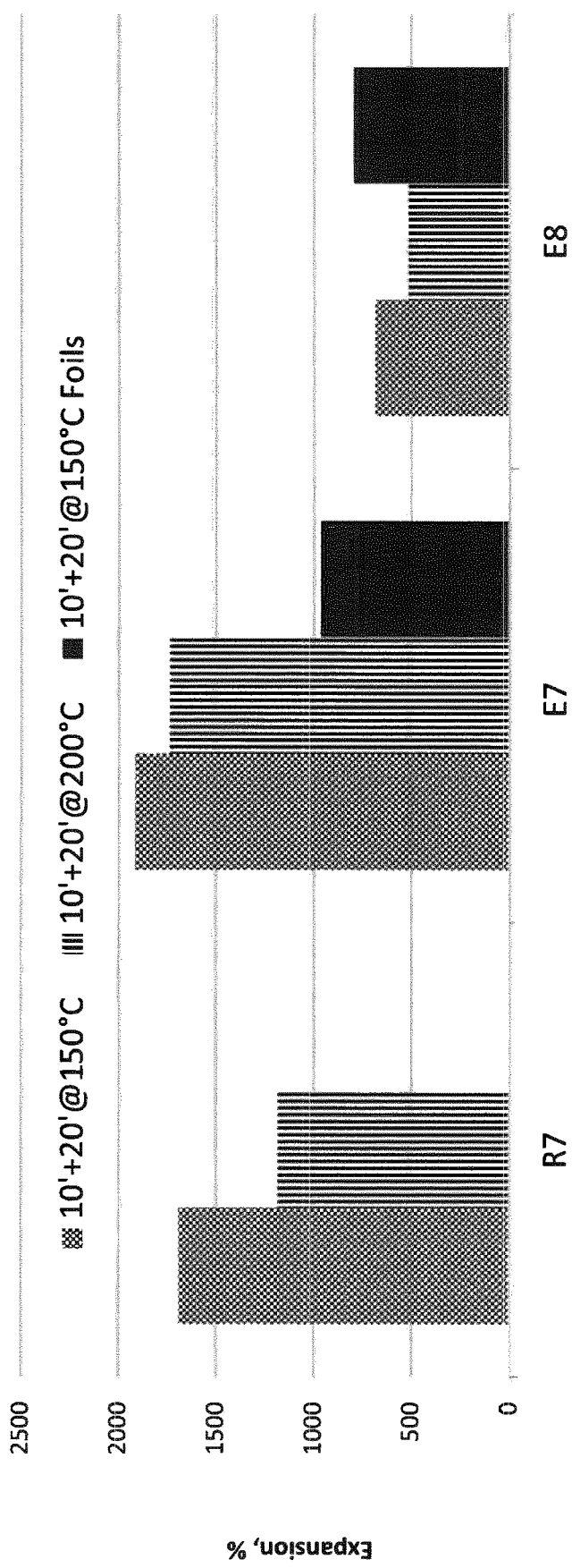
FIG. 4 is a graph depicting expansion percentages of samples tested at various temperatures.
Figure 5:
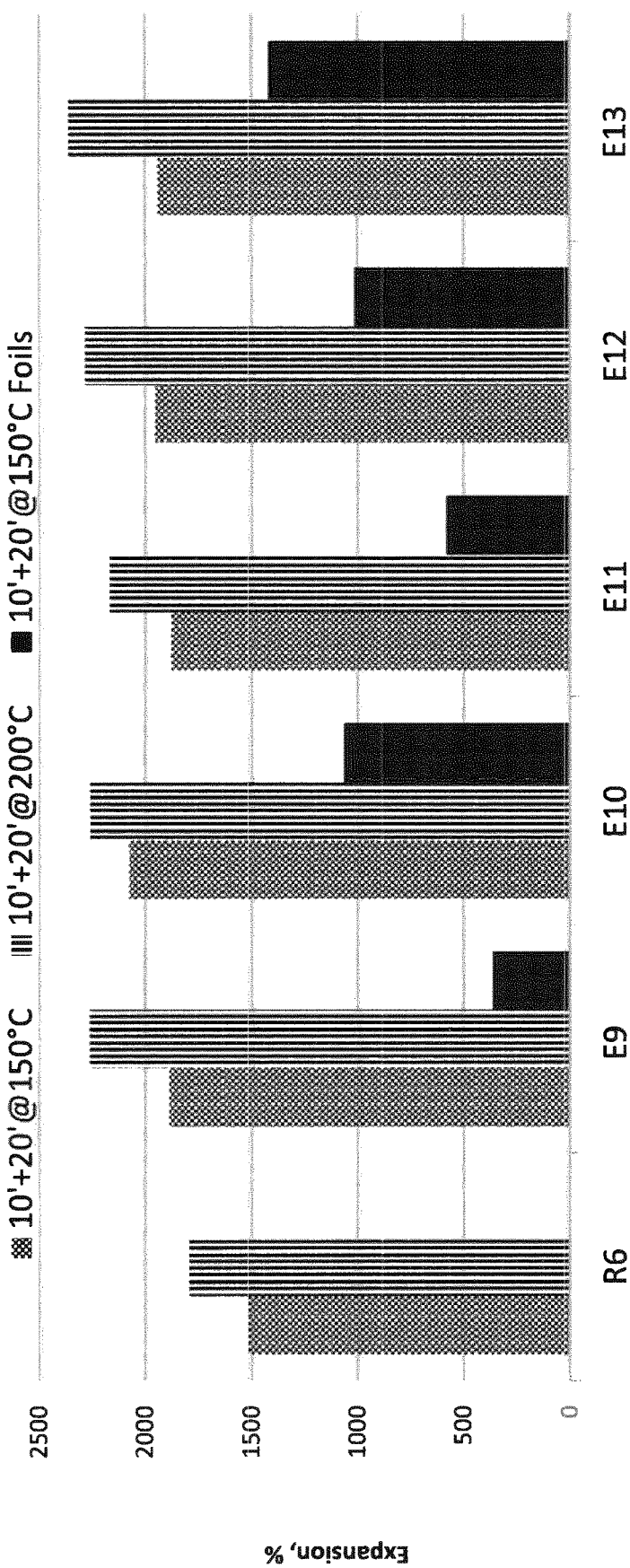
FIG. 5 is a graph depicting expansion percentages of samples tested at various temperatures.
Figure 6:
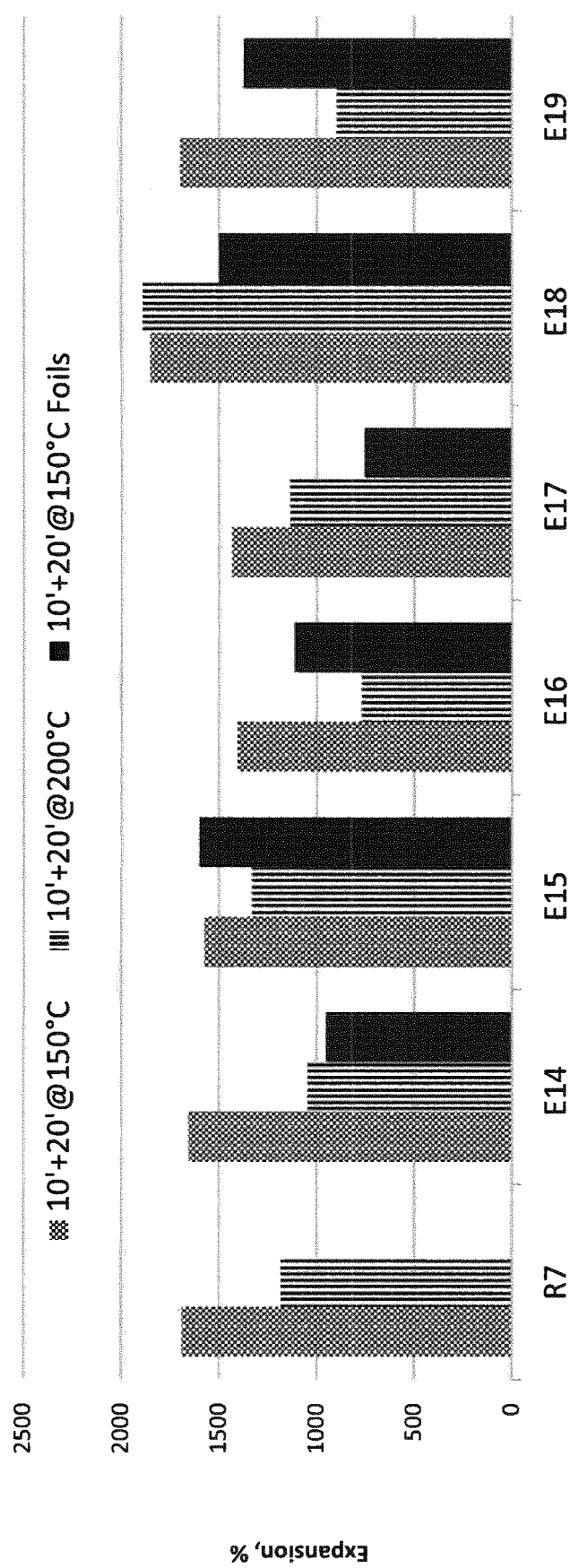
FIG. 6 is a graph depicting expansion percentages of samples tested at various temperatures.

The data in the FIGS. 1 and 2 show that only compositions containing sulfonate salts exhibit significant expansion behaviour when used in thin foils. Various non-ionic surfactants as well as sulfate surfactants do not exhibit significant expansion behaviour when used in the form of thin foils.

TABLE 2

Detailed compositions in wt.-% of ingredients based on the total weight of the compositions.

| Ingredient (wt.-%) | R1 | R2 | R3 | R4 | R5 | E1 | E2 |
|---|---|---|---|---|---|---|---|
| Polymer P1 | 35.9 | 35.9 | 35.9 | 35.9 | 35.9 | 35.9 | 35.9 |
| Polymer P2 | 32.7 | 32.2 | 32.2 | 32.2 | 32.2 | 32.2 | 32.2 |
| Adhesion promoter | 5.0 | 5.0 | 5.0 | 5.0 | 5.0 | 5.0 | 5.0 |
| Tackifier | 5.0 | 5.0 | 5.0 | 5.0 | 5.0 | 5.0 | 5.0 |
| Dispersion aid | 3.9 | 3.9 | 3.9 | 3.9 | 3.9 | 3.9 | 3.9 |
| Activator | 5.0 | 5.0 | 5.0 | 5.0 | 5.0 | 5.0 | 5.0 |
| Blowing agent | 9.0 | 9.0 | 9.0 | 9.0 | 9.0 | 9.0 | 9.0 |
| Peroxide | 2.1 | 2.1 | 2.1 | 2.1 | 2.1 | 2.1 | 2.1 |
| Acrylate | 1.4 | 1.4 | 1.4 | 1.4 | 1.4 | 1.4 | 1.4 |
| Non-ionic 1 | | 0.5 | | | | | |
| Non-ionic 2 | | | 0.5 | | | | |
| Non-ionic 3 | | | | 0.5 | | | |
| Sulfate 1 | | | | | 0.5 | | |
| Sulfonate salt 1 | | | | | | 0.5 | |
| Sulfonate salt 2 | | | | | | | 0.5 |
| Total (wt.-%) | 100 | 100 | 100 | 100 | 100 | 100 | 100 |
| EQ (peroxide/acrylate) | 0.71 | 0.71 | 0.71 | 0.71 | 0.71 | 0.71 | 0.71 |

TABLE 3

Detailed compositions in wt.-% of ingredients based on the total weight of the compositions.

| Ingredient (wt.-%) | R6 | E3 | E4 | E5 | E6 | R7 | E7 | E8 |
|---|---|---|---|---|---|---|---|---|
| Polymer P1 | 34.4 | 34.3 | 33.9 | 32.4 | 30.4 | 38.25 | 38 | 37.25 |
| Polymer P2 | 31.0 | 31.0 | 31.0 | 31.0 | 31.0 | 31.0 | 31.0 | 31.0 |
| Adhesion promoter | 5.0 | 5.0 | 5.0 | 5.0 | 5.0 | 5.0 | 5.0 | 5.0 |
| Tackifier | 5.0 | 5.0 | 5.0 | 5.0 | 5.0 | 5.0 | 5.0 | 5.0 |
| Dispersion aid | 3.95 | 3.95 | 3.95 | 3.95 | 3.95 | 3.95 | 3.95 | 3.95 |
| Activator | 5.0 | 5.0 | 5.0 | 5.0 | 5.0 | 5.0 | 5.0 | 5.0 |
| Blowing agent | 9.0 | 9.0 | 9.0 | 9.0 | 9.0 | 9.0 | 9.0 | 9.0 |
| Peroxide | 5.0 | 5.0 | 5.0 | 5.0 | 5.0 | 2.1 | 2.1 | 2.1 |
| Acrylate | 1.65 | 1.65 | 1.65 | 1.65 | 1.65 | 0.7 | 0.7 | 0.7 |
| Sulfonate salt 1 | — | 0.1 | 0.5 | 2 | 4 | — | 0.25 | 1 |
| Total (wt.-%) | 100 | 100 | 100 | 100 | 100 | 100 | 100 | 100 |
| EQ (peroxide/acrylate) | 1.41 | 1.41 | 1.41 | 1.41 | 1.41 | 1.41 | 1.41 | 1.41 |

TABLE 4

Detailed compositions in wt.-% of ingredients based on the total weight of the compositions.

| Ingredient (wt.-%) | R6 | E9 | E10 | E11 | E12 | E13 | R7 | E14 | E15 | E16 | E17 | E18 | E19 |
|---|---|---|---|---|---|---|---|---|---|---|---|---|---|
| Polymer P1 | 34.4 | 34.15 | 33.4 | 34.15 | 33.9 | 33.4 | 38.25 | 38 | 37.75 | 37.25 | 38 | 37.75 | 37.25 |
| Polymer P2 | 31.0 | 31.0 | 31.0 | 31.0 | 31.0 | 31.0 | 31.0 | 31.0 | 31.0 | 31.0 | 31.0 | 31.0 | 31.0 |
| Adhesion promoter | 5.0 | 5.0 | 5.0 | 5.0 | 5.0 | 5.0 | 5.0 | 5.0 | 5.0 | 5.0 | 5.0 | 5.0 | 5.0 |
| Tackifier | 5.0 | 5.0 | 5.0 | 5.0 | 5.0 | 5.0 | 5.0 | 5.0 | 5.0 | 5.0 | 5.0 | 5.0 | 5.0 |
| Dispersion aid | 3.95 | 3.95 | 3.95 | 3.95 | 3.95 | 3.95 | 3.95 | 3.95 | 3.95 | 3.95 | 3.95 | 3.95 | 3.95 |
| Activator | 5.0 | 5.0 | 5.0 | 5.0 | 5.0 | 5.0 | 5.0 | 5.0 | 5.0 | 5.0 | 5.0 | 5.0 | 5.0 |
| Blowing agent | 9.0 | 9.0 | 9.0 | 9.0 | 9.0 | 9.0 | 9.0 | 9.0 | 9.0 | 9.0 | 9.0 | 9.0 | 9.0 |
| Peroxide | 5.0 | 5.0 | 5.0 | 5.0 | 5.0 | 5.0 | 2.1 | 2.1 | 2.1 | 2.1 | 2.1 | 2.1 | 2.1 |
| Acrylate | 1.65 | 1.65 | 1.65 | 1.65 | 1.65 | 1.65 | 0.7 | 0.7 | 0.7 | 0.7 | 0.7 | 0.7 | 0.7 |
| Sulfonate salt 3 | | 0.25 | 1 | | | | | 0.25 | 0.5 | 1 | | | |
| Sulfonate salt 4 | | | | 0.25 | 0.5 | 1 | | | | | 0.25 | 0.5 | 1 |
| Total (wt.-%) | 100 | 100 | 100 | 100 | 100 | 100 | 100 | 100 | 100 | 100 | 100 | 100 | 100 |
| EQ (peroxide/acrylate) | 1.41 | 1.41 | 1.41 | 1.41 | 1.41 | 1.41 | 1.41 | 1.41 | 1.41 | 1.41 | 1.41 | 1.41 | 1.41 |

The invention claimed is:

1. A thermally expandable composition, comprising
   (a) at least one polymer P, cross-linkable by a free-radical initiator, and
   (b) at least one acrylate A, and
   (c) at least one free-radical initiator,
   (d) at least one blowing agent, and
   (e) at least one surfactant, whereby the surfactant is a sulfonate salt,
   wherein the thermally expandable composition exhibits an increase in volume when processed into a foil and heated,
   the at least one polymer P is ethylene vinyl acetate in an amount of between 48 and 70 wt.-%,
   the at least one acrylate A is in an amount of between 0.7 and 1.7 wt.-%,
   the at least one free-radical initiator is peroxide and in an amount of between 2 and 5 wt.-%,
   the at least one blowing agent is azodicarbonamide and is in an amount between 3 and 15 wt.-%, and
   the at least one sulfonate salt is in an amount of between 0.1 wt.-% and 5 wt.-%,
   the wt.-% is based on the total weight of the composition, and
   wherein
   the at least one polymer P has an average melt flow index in a range of 6 to 150 g/10 min,
   the at least one polymer P includes a content of vinyl acetate in an amount of between 18 and 28 wt.-%, based on a total weight of the at least one polymer P, and
   the thermally expandable composition exhibits an increase in volume of over 100% when processed into a foil having a thickness of 0.1 to 1 mm and heated between 110° C. and 220° C. for a time between 5 minutes and 90 minutes.

2. The thermally expandable composition of claim 1, wherein the equivalent ratio of the free-radical initiator to the acrylate A is between 0.1 and 10.

3. The thermally expandable composition of claim 1, wherein the sulfonate salt is selected from sulfonates from the group consisting of:
sulfosuccinates of the formula (I)

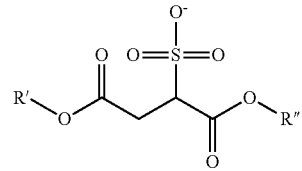

(I)

whereby R'=C8-C18, R"=H or C8-C18,
   alkyl benzene sulfonates,
   alkanesulfonates,
   ether sulfonates,
   methyl ester sulfonates, and
   alpha-olefin sulfonates.

4. A baffle and/or reinforcement element for open or hollow structures, wherein the element comprises a thermally expandable composition according to claim 1.

5. The baffle and/or reinforcement element of claim 4, wherein the thermally expandable composition has a sheet-like structure with a thickness of 0.1 to 1 mm.

6. The baffle and/or reinforcement element of claim 4, wherein the thermally expandable composition has a sheet-like structure with a length of 5 to 300 cm.

7. The baffle and/or reinforcement element of claim 4, wherein the element consists essentially of the thermally expandable composition.

8. The baffle and/or reinforcement element of claim 4, wherein the element comprises a carrier on which the thermally expandable composition is deposited or attached.

9. The baffle and/or reinforcement element of claim 8, wherein the carrier has a sheet-like structure with a thickness of 0.1 to 5 mm.

10. A method comprising a step of sealing, reinforcing, or baffling a cavity or hollow or open structure of a land-, water-, or air-vehicle, and/or a cavity of a building with the baffle and/or reinforcement element of claim 4 such that the transmission of noise, vibrations, humidity, and/or heat is reduced, and/or the object surrounding said cavity is mechanically strengthened.

11. A method for sealing, baffling and/or reinforcing a cavity or hollow structure, wherein an element comprising a thermally expandable composition according to claim 4 is introduced into the cavity or hollow structure and subsequently thermally expanded such that the cavity or hollow structure is at least partially filled by the expanded composition.

* * * * *

UNITED STATES PATENT AND TRADEMARK OFFICE
CERTIFICATE OF CORRECTION

| | |
|---|---|
| PATENT NO. | : 12,173,132 B2 |
| APPLICATION NO. | : 16/633544 |
| DATED | : December 24, 2024 |
| INVENTOR(S) | : Paripovic et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 572 days.

Signed and Sealed this
Eighth Day of July, 2025

Coke Morgan Stewart
*Acting Director of the United States Patent and Trademark Office*